(12) United States Patent
Matsui

(10) Patent No.: US 9,935,437 B2
(45) Date of Patent: Apr. 3, 2018

(54) ELECTRICAL CONNECTION BOX

(71) Applicant: Sumitomo Wiring Systems, Ltd., Yokkaichi, Mie (JP)

(72) Inventor: Toshiyuki Matsui, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/605,421

(22) Filed: May 25, 2017

(65) Prior Publication Data

US 2017/0346266 A1 Nov. 30, 2017

(30) Foreign Application Priority Data

May 27, 2016 (JP) .................................. 2016-106324

(51) Int. Cl.
*B60R 16/02* (2006.01)
*H02G 3/08* (2006.01)
*H02G 3/14* (2006.01)
*B60R 16/023* (2006.01)

(52) U.S. Cl.
CPC .......... *H02G 3/083* (2013.01); *B60R 16/0215* (2013.01); *B60R 16/0239* (2013.01); *H02G 3/14* (2013.01)

(58) Field of Classification Search
CPC .................... B60R 16/0215; B60R 16/0239
See application file for complete search history.

(56) References Cited

U.S. PATENT DOCUMENTS

| 6,561,822 B2 * | 5/2003 | Depp ..................... H05K 7/026 439/521 |
| 6,837,745 B2 * | 1/2005 | Takada ................. H01R 13/562 439/521 |
| 7,507,905 B2 * | 3/2009 | Kanamaru ............... H01R 9/24 174/489 |
| 7,586,038 B2 * | 9/2009 | Kanamaru ............. H02G 3/083 174/489 |
| 7,934,934 B2 * | 5/2011 | Taniguchi .............. H02G 3/083 439/76.1 |
| 8,835,759 B1 * | 9/2014 | Escobar .................. B60R 13/08 174/135 |
| 9,463,757 B2 * | 10/2016 | Soh ...................... B60R 16/0239 |
| 9,748,750 B2 * | 8/2017 | Matsui .................... H02G 3/088 |

FOREIGN PATENT DOCUMENTS

JP 2010-041808 A 2/2010

\* cited by examiner

*Primary Examiner* — Hung V Ngo
(74) *Attorney, Agent, or Firm* — Dinsmore & Shohl LLP

(57) ABSTRACT

An electrical connection box includes: a casing that has an opening portion open upwardly, a recessed portion recessed downwardly from an upper edge portion of a side wall; and a slidable cover configured to close the recessed portion. A first thin portion is formed at a side edge portion of the recessed portion of the casing. A second thin portion is formed on the slidable cover. The first thin portion and the second thin portion overlap each other when the slidable cover is fitted into the recessed portion. The first thin portion is includes a chamfered portion where a boundary between an opening edge portion of the first thin portion and the side edge portion is chamfered. A contact portion is configured to be brought into contact with the chamfered portion.

9 Claims, 12 Drawing Sheets

ELECTRICAL CONNECTION BOX

CROSS-REFERENCE TO RELATED APPLICATIONS

This application claims the priority of Japanese Patent Application No. JP 2016-106324 filed on May 27, 2016.

TECHNICAL FIELD

The technology disclosed in the present specification relates to an electrical connection box.

BACKGROUND ART

JP 2010-41808A is known as a conventional electrical connection box that is to be mounted on a vehicle, to supply power to on-board electrical components such as a lamp and a heater. This electrical connection box turns ON and OFF a current that is supplied to the on-board electrical components, by using a relay that is housed in a casing, for example.

As shown in FIG. 3 of JP 2010-41808A, a cutout portion is formed in a side wall of the casing. The cutout portion is open in the thickness direction of the side wall. As shown in FIG. 4 of JP 2010-41808A, this cutout portion is closed by a slidable cover during the process of assembling the electrical connection box.

According to conventional technology, an outer rib and an inner rib that are formed on the slidable cover are respectively housed in an outer groove and an inner groove that are formed in the casing. Thus, a complex structure (a so-called labyrinth structure) is formed between the outer rib and the outer groove and between the inner rib and the inner groove. As a result, the space between the casing and the closure cover is waterproofed.

JP 2010-41808A is an example of related art.

However, in the above-described configuration, the outer groove, the outer rib, the inner groove, and the inner rib are sequentially arranged in the thickness direction of the side wall of the casing, and there is the problem of the casing being large in size.

To solve this problem, it is possible to make the outer rib or the inner rib thinner. However, there is the concern that simply making the outer rib or the inner rib thinner will lead to a decrease in the strength of the outer rib or the inner rib.

The technology disclosed in the present specification has been completed based on the above-described situation, and aims to provide an electrical connection box that has a slidable cover with improved strength.

SUMMARY OF THE INVENTION

An electrical connection box according to the technology disclosed in the present specification includes: a casing that has a side wall whose upper edge portion is configured as an opening portion that is open upward, and has a recessed portion that is recessed downward from the upper edge portion of the side wall; and a slidable cover that is configured to be fitted into the recessed portion from the opening portion side, wherein a first thin portion that is thinner than the side wall is formed at a side edge portion of the recessed portion of the casing so as to extend in a direction in which the opening portion is open, a second thin portion that is thinner than the slidable cover is formed on the slidable cover so as to extend in the direction in which the opening portion is open, the first thin portion and the second thin portion overlap each other in a situation where the slidable cover is fitted into the recessed portion, the first thin portion is provided with a chamfered portion where a boundary between an opening edge portion of the first thin portion and the side edge portion is chamfered, and a contact portion that is configured to be brought into contact with the chamfered portion is formed on the slidable cover, at a position that corresponds to the chamfered portion in a situation where the slidable cover is fitted into the recessed portion.

According to the above-described configuration, a contact portion that is configured to be brought into contact with a chamfered portion that is formed on the casing is formed on the slidable cover. This contact portion improves the strength of the slidable cover because the thin portion of the slidable cover is reinforced in the thickness direction of the slidable cover.

The following are preferable modes in which the technology disclosed in the present specification is carried out.

It is preferable, in a situation where the slidable cover is fitted into the recessed portion, that the first thin portion and the second thin portion overlap each other, within a range of a thickness of the side wall.

The above-described configuration prevents the casing and the slidable cover from being large in size in the thickness direction of the side wall of the casing.

It is preferable that a lid member that is configured to close the opening portion is attached to the casing, and the slidable cover is provided with a lock portion that is configured to elastically engage with the lid member.

The above-described configuration improves waterproof properties between the casing and the slidable cover because the slidable cover is pressed against the casing by the lid member that is attached to the casing, and the degree of contact between the casing and the slidable cover is improved.

Furthermore, since the slidable cover is provided with the lock portion that is configured to engage with the lid member, the slidable cover is more reliably pressed by the lid member. As a result, waterproof properties between the casing and the slidable cover are further improved.

It is preferable that the lid member is an electronic device that is provided with an electronic component.

With the above-described configuration, the lid member is provided with the electronic component, and is therefore larger in mass than a simple lid. As a result, the slidable cover is reliably pressed against the casing by this lid member, and waterproof properties between the casing and the slidable cover are improved.

It is preferable that an outlet port that is configured to allow an electrical wire that is located inside the casing to be drawn out therefrom is provided between the side wall and the slidable cover in a situation where the slidable cover is fitted into the recessed portion, and a fixing portion that is configured to allow the electrical wire to be attached thereto is provided on the slidable cover.

With the above-described configuration, the slidable cover is pressed by the electrical wire, and accordingly the slidable cover is pressed against the casing. As a result, the degree of contact between the casing and the slidable cover is improved, which leads to an improvement in waterproof properties between the casing and the slidable cover.

With the technology disclosed in the present specification, it is possible to prevent the casing of the electrical connection box from being damaged.

DETAILED DESCRIPTION OF THE PREFERRED EMBODIMENTS

A first embodiment in which the technology disclosed in the present specification is applied to an electrical connection box 10 for vehicles will be described with reference to FIGS. 1 to 12. The electrical connection box 10 is connected between a power supply (not shown) such as a battery and on-board electrical components (not shown) such as head lamps and wipers, and supplies or interrupts power to the various kinds of on-board electrical components. The electrical connection box 10 includes a casing 11 in which an opening portion 12 that is open upward is formed. Note that, in the following description, it is assumed that a Z direction is an upward direction, an X direction is a rightward direction, and a Y direction is a downward direction.

Casing 11

Figure 1:
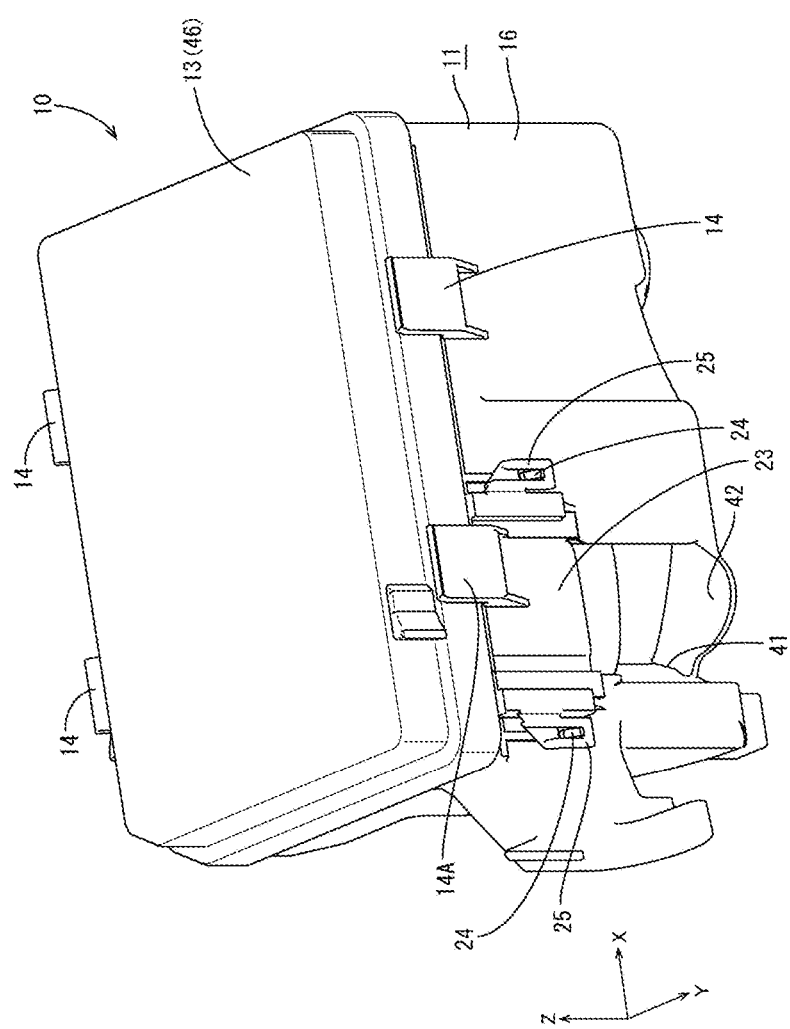
FIG. 1 is a perspective view showing an electrical connection box according to a first embodiment.
Figure 2:
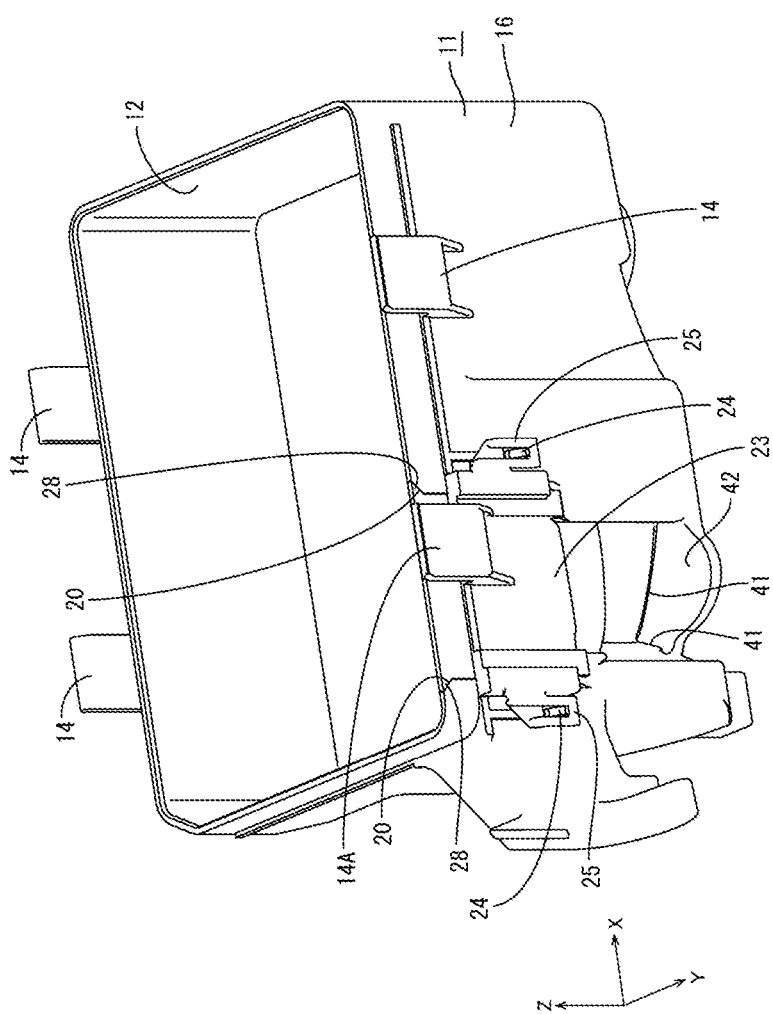
FIG. 2 is a perspective view showing the electrical connection box from which a lid member has been removed.

As shown in FIG. 2, the opening portion 12 that is open upward is formed in the casing 11 that is made of a synthetic resin. As shown in FIG. 1, this opening portion 12 is configured to be closed by a lid member 13 that is made of a synthetic resin being attached to the casing 11 from above. The casing 11 and the lid member 13 are assembled into one piece by lock portions 14 that are provided on the casing 11, and lock receiver portions 15 that are provided on the lid member 13, elastically engaging with each other. Although a connector, a relay, and so on are housed within the opening portion 12, a detailed configuration is omitted. The casing 11 has a side wall 16, and an upper edge portion of the side wall 16 is configured as the opening portion 12 that is open upward. Note that the wall surface of the side wall 16 extends in the top-bottom direction.

Figure 5:
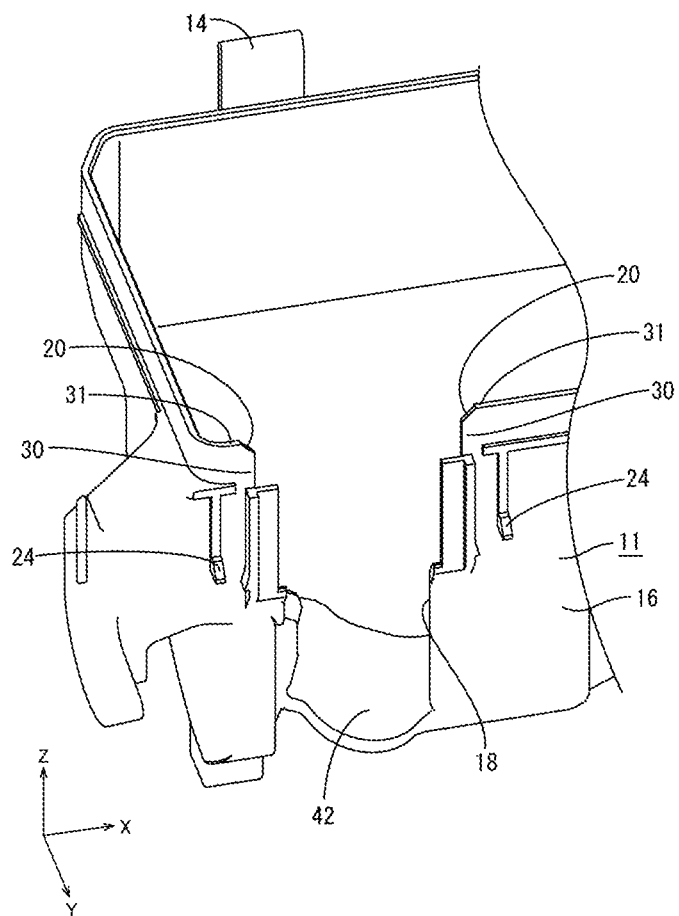
FIG. 5 is a partially enlarged perspective view showing the electrical connection box from which the lid member has been removed and a slidable cover has been removed.
Figure 6:
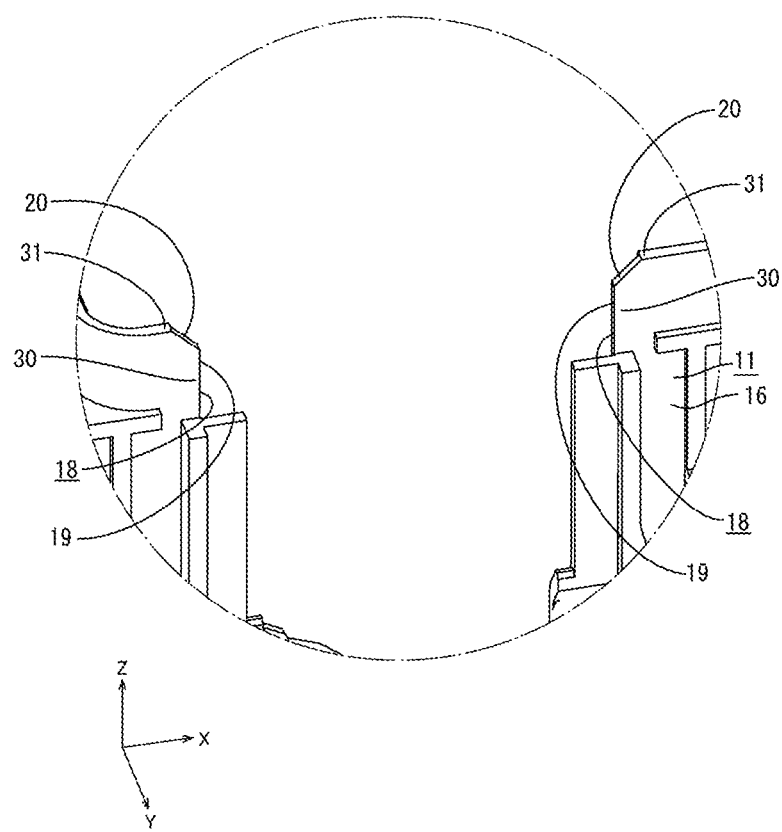
FIG. 6 is a partially enlarged perspective view showing the shape of a recessed portion.
Figure 7:
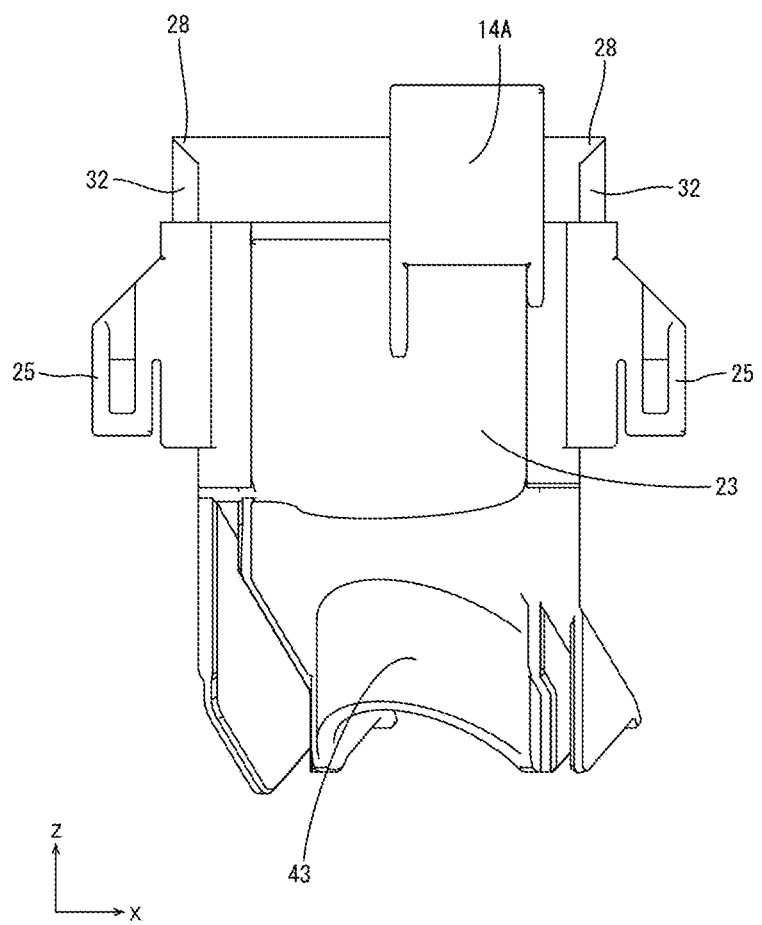
FIG. 7 is a side view showing the slidable cover.
Figure 8:
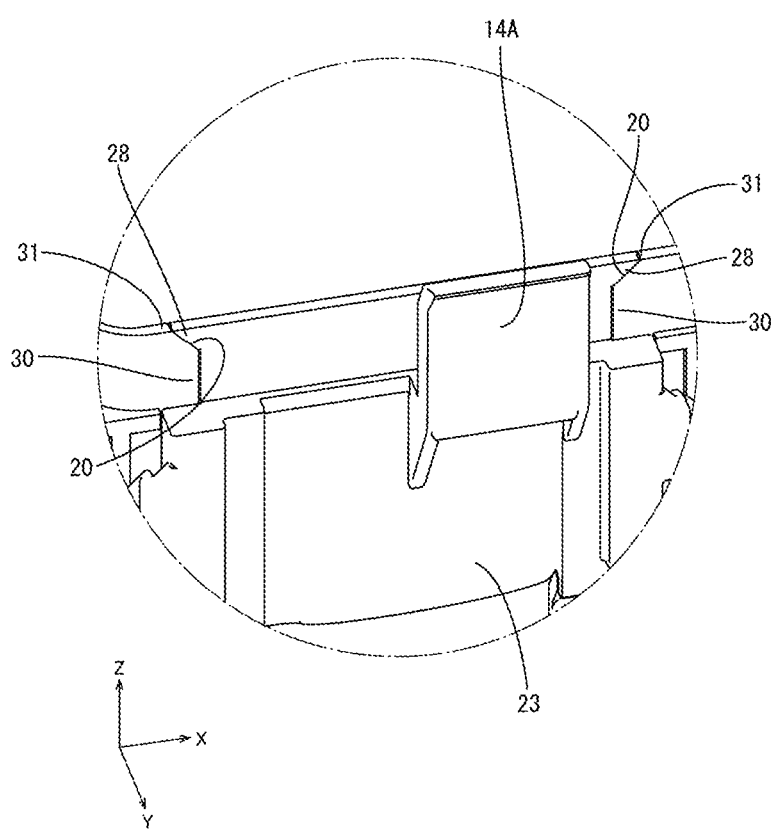
FIG. 8 is a partially enlarged perspective view showing the recessed portion into which the slidable cover is fitted.
Figure 9:
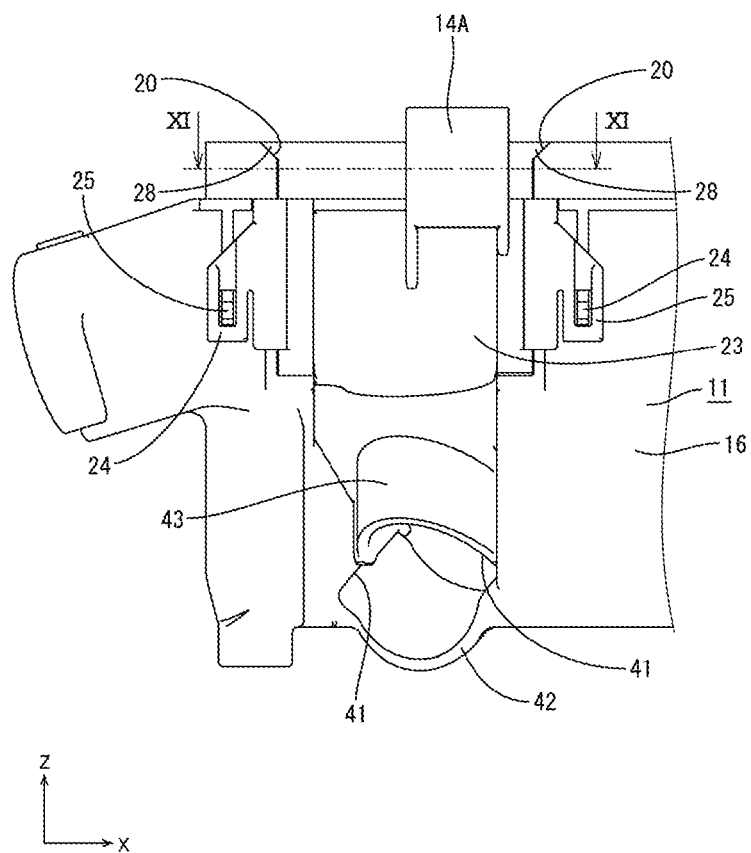
FIG. 9 is a partially enlarged side view showing the electrical connection box from which the lid member has been removed.
Figure 11:
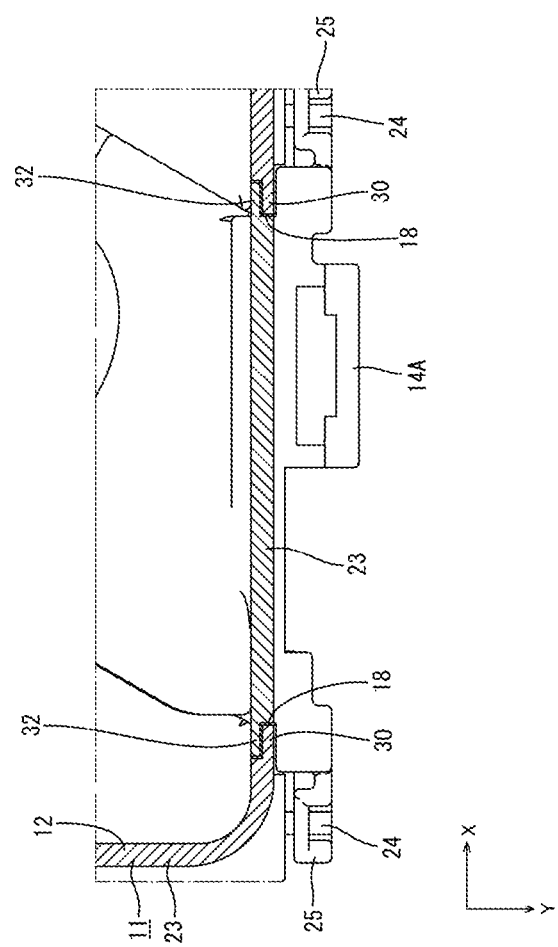
FIG. 11 is a cross-sectional view along a line XI-XI in FIG. 9.

As shown in FIGS. 5 and 6, a recessed portion 18 that is recessed downward from the upper edge portion of the side wall 16 is formed in the side wall 16. As shown in FIG. 11, first thin portions 30 that are thinner than the side wall 16 are respectively formed at side edge portions 19 of the recessed portion 18 so as to extend in the direction in which the opening portion 12 is open (the top-bottom direction).

The first thin portions 30 are formed on the outer surface side of the side wall 16. Thus, the inner surfaces of the first thin portions 30 and the inner surface of the side wall 16 are formed in a step-like shape in the thickness direction of the side wall 16. The first thin portions 30 are respectively provided at the two side edges of the recessed portion 18.

As shown in FIG. 6, each first thin portion 30 is provided with a chamfered portion 20 where the boundary between an opening edge portion 31 (an upper edge portion) of the first thin portion 30 and the corresponding side edge portion 19 of the recessed portion 18 is chamfered. In the present embodiment, each chamfered portion 20 is formed in a shape from which a corner has been cut off along a straight line.

Slidable Cover 23

Figure 3:
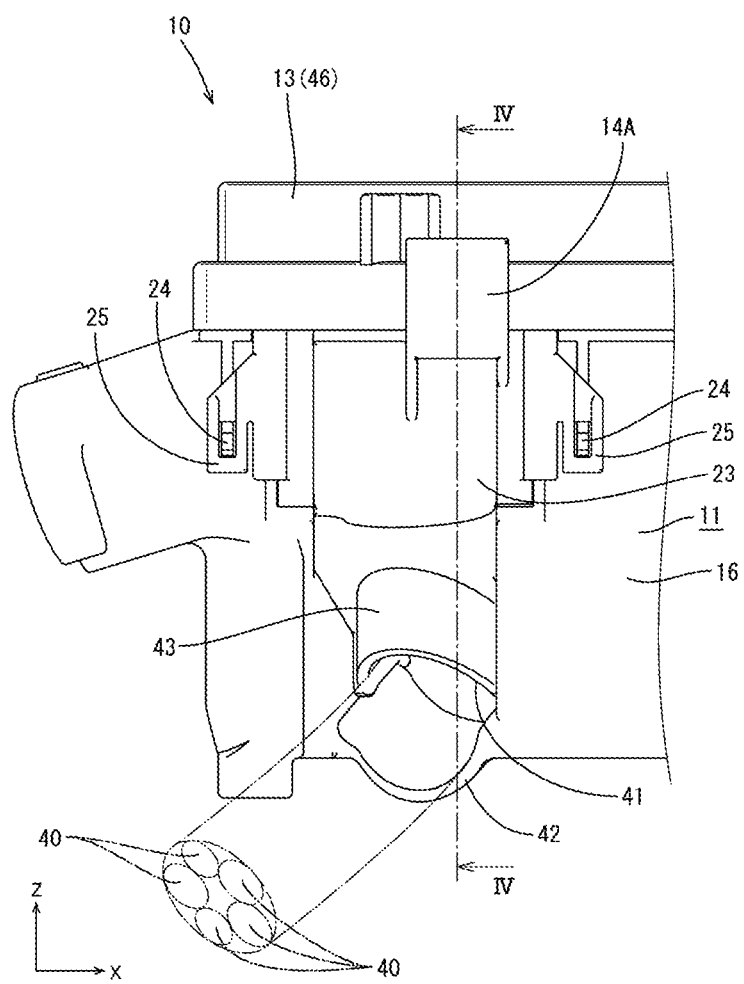
FIG. 3 is a partially enlarged side view showing the electrical connection box.

As shown in FIGS. 2 and 3, the recessed portion 18 is configured such that a slidable cover 23 that is made of a synthetic resin can be fitted thereinto from the opening portion 12 side (from above). In the situation where the slidable cover 23 is fitted into the recessed portion 18, the recessed portion 18 excluding an outlet port 41 that will be described later is closed by the slidable cover 23. In the situation where the slidable cover 23 is fitted into the recessed portion 18, an upper edge portion of the slidable cover 23 and the upper edge portion of the side wall 16 of the casing 11 are substantially flush.

Engaging protruding portions 24 that protrude outward are formed on the outer surface of the side wall 16 of the casing 11, respectively on the left and right sides of the recessed portion 18. On the other hand, engaging receiving portions 25 that are configured to elastically engage with the engaging protruding portions 24 are provided on the slidable cover 23, at positions that correspond to the engaging protruding portions 24 in a situation where the slidable cover 23 is fitted into the recessed portion 18. In side view, each engaging receiving portion 25 has a frame-like shape. The engaging protruding portions 24 are respectively fitted into the frames of the engaging receiving portions 25, and thus the slidable cover 23 is attached to the casing 11.

The thickness of the slidable cover 23 is set to be substantially the same as the thickness of the side wall 16 of the casing 11. Thus, in a situation where the slidable cover 23 is fitted into the recessed portion 18, the outer surface of the slidable cover 23 and the outer surface of the side wall 16 are substantially flush, and the inner surface of the slidable cover 23 and the inner surface of the side wall 16 are also substantially flush.

As shown in FIG. 11, second thin portions 32 that are thinner than the slidable cover 23 are formed at side edge portions of the slidable cover 23 so as to extend in the direction in which the opening portion 12 is open (the top-bottom direction). The second thin portions 32 are formed on the inner surface side of the slidable cover 23. Thus, the outer surfaces of the second thin portions 32 and the outer surface of the slidable cover 23 are formed in a step-like shape in the thickness direction of the slidable cover 23. The second thin portions 32 are respectively provided at the two side edges of the slidable cover 23.

Figure 10:
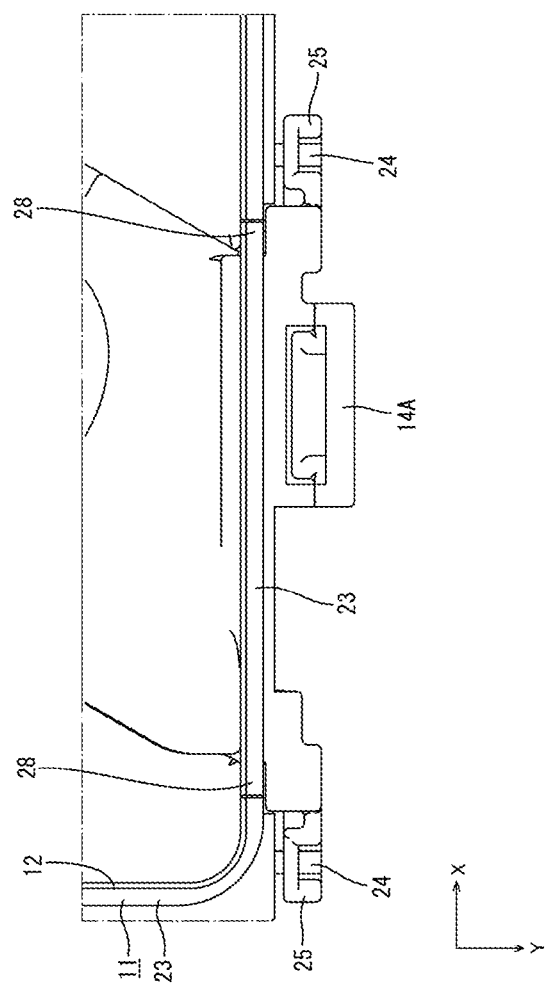
FIG. 10 is a partially enlarged plan view showing the recessed portion into which the slidable cover is fitted.

As shown in FIG. 10, in a situation where the slidable cover 23 is fitted into the recessed portion 18, the first thin portions 30 respectively overlap the second thin portions 32 in the thickness direction of the side wall 16 of the casing 11, within the range of the thickness of the side wall 16 of the casing 11. Also, in a situation where the slidable cover 23 is fitted into the recessed portion 18, the first thin portions 30 respectively overlap the second thin portions 32 in the thickness direction of the slidable cover 23, within the range of the thickness of the slidable cover 23.

Contact portions 28 that are configured to be brought into contact with the chamfered portions 20 from above are formed in the second thin portions 32 of the slidable cover 23, at positions that respectively correspond to the chamfered portions 20 formed in the first thin portions 30 of the casing 11. The contact portions 28 have a shape that corresponds to the shape of the chamfered portions 20. Thus, in a situation where the slidable cover 23 is attached to the casing 11, the contact portions 28 are in intimate contact with the chamfered portions 20. As a result, areas that correspond to the chamfered portions 20 are closed by the contact portions 28.

Figure 12:
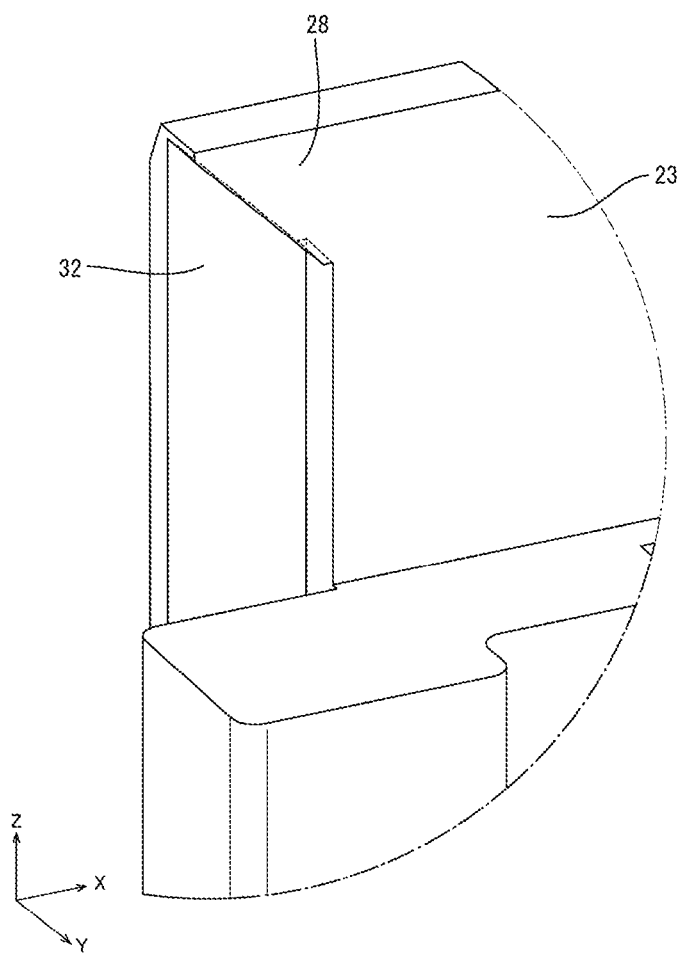
FIG. 12 is a partially enlarged perspective view showing a contact portion.

As shown in FIG. 12, the contact portions 28 are formed by setting upper end portions of the two side edge portions of the second thin portions 32 to be thicker than other portions. The thickness of the contact portions 28 is set to be substantially the same as the thickness of the side wall 16 of the casing 11. Thus, in a situation where the slidable cover 23 is fitted into the recessed portion 18, the outer surfaces of the contact portions 28 are substantially flush with the outer surface of the side wall 16 of the casing 11.

A lock portion 14A that is configured to elastically engage with the corresponding lock receiving portion 15 that is provided on the lid member 13 is formed on the outer surface of the slidable cover 23. The shape of the lock portion 14A that is formed on the slidable cover 23 is the same as the shape of the lock portions 14 that are formed on the outer surface of the casing 11.

In a situation where the slidable cover 23 is fitted into the recessed portion 18, the outlet port 41 that is configured to allow a plurality of electrical wires 40 that are located inside the casing 11 to be drawn out therefrom is provided between the side wall 16 of the casing 11 and a lower end portion of the slidable cover 23 (see FIG. 3). In the present embodiment, the diameters of the electrical wires 40 may by the same or different, and can be appropriately set as needed.

A mounting portion 42 that constitutes a lower portion of the outlet port 41 and on which the electrical wires 40 are to be mounted is provided at a lower end portion of the recessed portion 18. The mounting portion 42 is formed in a groove-like shape whose upper surface is recessed. Also, a fixing portion 43 that is configured to allow the electrical wires 40 to be fixed thereto is provided on a lower end portion of the slidable cover 23. The fixing portion 43 is located on a lower end portion of the slidable cover 23, at a position that is opposite the mounting portion 42 of the recessed portion 18, and is formed in an eave-like shape.

The plurality of electrical wires 40 are fixed to the fixing portion 43 and the mounting portion 42 by winding a well-known tape (not shown) around the plurality of electrical wires 40 that are mounted on the mounting portion 42.

Lid Member 13

The lid member 13 has a shape that corresponds to the shape of the opening portion 12 of the casing 11 and is slightly larger than the opening portion 12. Thus, the lid member 13 is configured to close the opening portion 12 of the casing 11.

Figure 4:
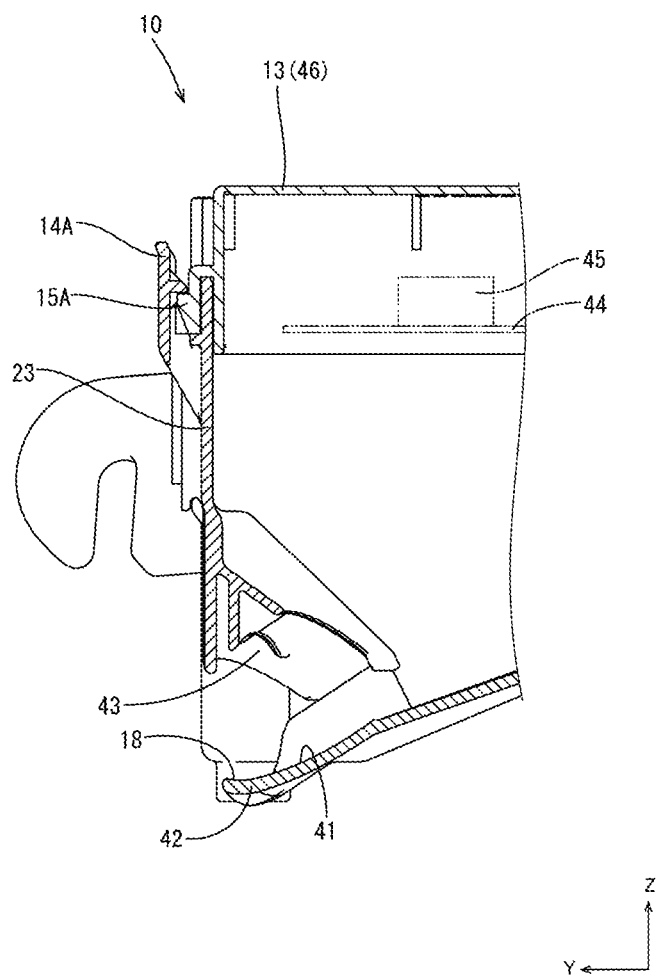
FIG. 4 is a cross-sectional view along a line IV-IV in FIG. 3.

As shown in FIG. 4, in the present embodiment, the lid member 13 is formed in a box-like shape. A circuit board 44 and an electronic component 45 that is mounted on the circuit board 44 are housed inside the lid member 13. In this way, in the present embodiment, the lid member 13 is configured as an electronic device 46 that is provided with the electronic component 45. Therefore, the lid member 13 according to the present embodiment is larger in mass than a simple lid that is not provided with the electronic component 45 inside.

Actions and Effects of Present Embodiment

Next, the actions and the effects of the present embodiment will be described. An electrical connection box 10 according to the present embodiment includes: a casing 11 that has a side wall 16 whose upper edge portion is configured as an opening portion 12 that is open upward, and has a recessed portion 18 that is recessed downward from the upper edge portion of the side wall 16: and a slidable cover 23 that is configured to be fitted into the recessed portion 18 from the opening portion 12 side, wherein a first thin portion 30 that is thinner than the side wall 16 is formed at a side edge portion 19 of the recessed portion 18 so as to extend in a direction in which the opening portion 12 is open, a second thin portion 32 that is thinner than the slidable cover 23 is formed on the slidable cover 23 so as to extend in the direction in which the opening portion 12 is open, the first thin portion 30 and the second thin portion 32 overlap each other in a situation where the slidable cover 23 is fitted into the recessed portion 18, the first thin portion 30 is provided with a chamfered portion 20 where a boundary between an opening edge portion 31 of the first thin portion 30 and the side edge portion is chamfered, and a contact portion 28 that is configured to be brought into contact with the chamfered portion 20 is formed on the slidable cover 23, at a position that corresponds to the chamfered portion 20 in a situation where the slidable cover 23 is fitted into the recessed portion 18.

According to the above-described configuration, a contact portion 28 that is configured to be brought into contact with a chamfered portion 20 that is formed on the casing 11 is formed on the slidable cover 23. This contact portion 28 improves the strength of the slidable cover 23 because the second thin portion 32 of the slidable cover 23 is reinforced in the thickness direction of the slidable cover 23.

Also, according to the present embodiment, in a situation where the slidable cover 23 is fitted into the recessed portion 18, the first thin portion 30 and the second thin portion 32 overlap each other, within a range of the thickness of the side wall 16.

The above-described configuration prevents the casing 11 and the slidable cover 23 from being large in size in the thickness direction of the side wall 16 of the casing 11.

Also, according to the present embodiment, a lid member 13 that is configured to close the opening portion 12 is attached to the casing 11, and the slidable cover 23 is provided with a lock portion 14A that is configured to elastically engage with the lid member 13.

The above-described configuration improves waterproof properties between the casing 11 and the slidable cover 23 because the slidable cover 23 is pressed against the casing 11 by the lid member 13 that is attached to the casing 11, and the degree of contact between the casing 11 and the slidable cover 23 is improved.

Furthermore, since the slidable cover 23 is provided with the lock portion 14A that is configured to engage with the lid member 13, the slidable cover 23 is more reliably pressed by the lid member 13. As a result, waterproof properties between the casing 11 and the slidable cover 23 are further improved.

Also, in the present embodiment, the lid member 13 is an electronic device 46 that is provided with an electronic component 45.

With the above-described configuration, the lid member 13 is provided with the electronic component 45, and is therefore larger in mass than a simple lid. As a result, the slidable cover 23 is reliably pressed against the casing 11 by this lid member 13, and waterproof properties between the casing 11 and the slidable cover 23 are improved.

Also, according to the present embodiment, an outlet port 41 that is configured to allow an electrical wire 40 that is located inside the casing 11 to be drawn out therefrom is provided between the side wall 16 and the slidable cover 23 in a situation where the slidable cover 23 is fitted into the recessed portion 18, and a fixing portion 43 that is configured to allow the electrical wire 40 to be attached thereto is provided on the slidable cover 23.

With the above-described configuration, the slidable cover 23 is pressed by the electrical wire 40, and accordingly the slidable cover 23 is pressed against the casing 11. As a result, the degree of contact between the casing 11 and the slidable cover 23 is improved, which leads to an improvement in waterproof properties between the casing 11 and the slidable cover 23.

Other Embodiments

The technology disclosed in the present specification is not limited to the embodiment that has been illustrated based on the above descriptions and the drawings, and, for example, the following embodiments are included in the technical scope of the technology disclosed in the present specification.

(1) In the above-described embodiment, each chamfered portion 20 is formed in a shape from which a corner has been cut off along a straight line. However, such a configuration is not essential, and each chamfered portion 20 may be formed in a shape from which a corner has been cut off along a curved line. In other words, the chamfered portions may each have a round-chamfered shape. If this is the case, the contact portions 28 are each formed in a curved shape so as to correspond to the chamfered portions. Also, the chamfered portions can be formed in any shape as appropriate, and the contact portions 28 are formed so as to match the shape of the chamfered portions.

(2) In the above-described embodiment, the lid member 13 is configured as the electronic device 46 that is provided with the electronic component 45. However, such a configuration is not essential, and a simple lid that is made of a synthetic resin and is not provided with the electronic component 45 inside may be employed.

(3) In the above-described embodiment, the first thin portions 30 and the second thin portions 32 overlap each other within the range of the thickness of the side wall 16. However, such a configuration is not essential, and the first thin portions 30 and the second thin portions 32 overlapping each other may be thicker or thinner than the side wall 16 of the casing 11.

(4) In the above-described embodiment, the outlet port 41 that allows the electrical wires 40 to be drawn out therefrom is formed between the slidable cover 23 and the casing 11. However, such a configuration is not essential, and a configuration in which the outlet port 41 is not formed between the slidable cover 23 and the casing 11 may be employed.

(5) In the above-described embodiment, the first thin portions 30 are located on the outer surface side of the casing 11, and the second thin portions 32 are located on the inner surface side of the casing 11. However, such a configuration is not essential, and a configuration in which the first thin portions are located on the inner surface side of the casing 11, and the second thin portions are located on the outer surface side of the casing 11 may be employed.

What is claimed is:

1. An electrical connection box comprising:
   a casing that has a side wall whose upper edge portion is configured as an opening portion that is open upward, and has a recessed portion that is recessed downward from the upper edge portion of the side wall; and
   a slidable cover that is configured to be fitted into the recessed portion from the opening portion side,
   wherein a first thin portion that is thinner than the side wall is formed at a side edge portion of the recessed portion of the casing so as to extend in a direction in which the opening portion is open,
   a second thin portion that is thinner than the slidable cover is formed on the slidable cover so as to extend in the direction in which the opening portion is open,
   the first thin portion and the second thin portion overlap each other in a situation where the slidable cover is fitted into the recessed portion,
   the first thin portion is provided with a chamfered portion where a boundary between an opening edge portion of the first thin portion and the side edge portion is chamfered, and
   a contact portion that is configured to be brought into contact with the chamfered portion is formed on the slidable cover, at a position that corresponds to the chamfered portion in a situation where the slidable cover is fitted into the recessed portion.

2. The electrical connection box according to claim 1, wherein, in a situation where the slidable cover is fitted into the recessed portion, the first thin portion and the second thin portion overlap each other, within a range of a thickness of the side wall.

3. The electrical connection box according to claim 2, wherein a lid member that is configured to close the opening portion is attached to the casing, and the slidable cover is provided with a lock portion that is configured to elastically engage with the lid member.

4. The electrical connection box according to claim 2, wherein an outlet port that is configured to allow an electrical wire that is located inside the casing to be drawn out therefrom is provided between the side wall and the slidable cover in a situation where the slidable cover is fitted into the recessed portion, and a fixing portion that is configured to allow the electrical wire to be fixed thereto is provided on the slidable cover.

5. The electrical connection box according to claim 1, wherein a lid member that is configured to close the opening portion is attached to the casing, and the slidable cover is provided with a lock portion that is configured to elastically engage with the lid member.

6. The electrical connection box according to claim 5, wherein the lid member is an electronic device that is provided with an electronic component.

7. The electrical connection box according to claim 6, wherein an outlet port that is configured to allow an electrical wire that is located inside the casing to be drawn out therefrom is provided between the side wall and the slidable cover in a situation where the slidable cover is fitted into the recessed portion, and a fixing portion that is configured to allow the electrical wire to be fixed thereto is provided on the slidable cover.

8. The electrical connection box according to claim 5, wherein an outlet port that is configured to allow an electrical wire that is located inside the casing to be drawn out therefrom is provided between the side wall and the slidable cover in a situation where the slidable cover is fitted into the recessed portion, and a fixing portion that is configured to allow the electrical wire to be fixed thereto is provided on the slidable cover.

9. The electrical connection box according to claim 1, wherein an outlet port that is configured to allow an electrical wire that is located inside the casing to be drawn out therefrom is provided between the side wall and the slidable cover in a situation where the slidable cover is fitted into the recessed portion, and a fixing portion that is configured to allow the electrical wire to be fixed thereto is provided on the slidable cover.

* * * * *